United States Patent [19]

Haaf et al.

[11] Patent Number: 5,034,459

[45] Date of Patent: Jul. 23, 1991

[54] POLYPHENYLENE ETHER COMPOSITIONS HAVING IMPROVED FLOW

[75] Inventors: William R. Haaf, Voorheesville, N.Y.; Robert J. Axelrod, Breinigsville, Pa.

[73] Assignee: General Electric Co., Selkirk, N.Y.

[21] Appl. No.: 291,849

[22] Filed: Feb. 2, 1989

Related U.S. Application Data

[62] Division of Ser. No. 122,100, Nov. 18, 1987, Pat. No. 4,826,919.

[51] Int. Cl.$^5$ ............................................. C08L 71/12

[52] U.S. Cl. ....................................... 525/68; 525/92; 525/905

[58] Field of Search .......................... 525/92, 905, 68

[56] References Cited

U.S. PATENT DOCUMENTS 4,764,559  8/1988  Yamauchi et al. .................... 525/92

Primary Examiner—Jacob Ziegler
Attorney, Agent, or Firm—Francis T. Coppa

[57] ABSTRACT

The melt flow behavior of blends of polyphenylene ether resins and alkenyl aromatic resins such as high impact polystyrene can be markedly improved by incorporation therein of effective amounts of styrene-alpha methyl styrene copolymers.

6 Claims, No Drawings

POLYPHENYLENE ETHER COMPOSITIONS HAVING IMPROVED FLOW

This is a division of application Ser. No. 122,100, filed Nov. 18, 1987, now U.S. Pat. No. 4,826,919.

FIELD OF THE INVENTION

Melt flow behavior for polyphenylene ether compositions comprising a polyphenylene ether resin and a rubber modified alkenyl aromatic resin can be improved by incorporating effective amounts of low molecular weight copolymers of styrene and alpha methyl styrene. Good flow behavior and improved impact strength can be simultaneously achieved by replacing a portion of the rubber modified alkenyl aromatic composition with a combination of the copolymer of styrene and alpha methyl styrene and a thermoplastic elastomer.

BACKGROUND OF THE INVENTION

Polyphenylene ether (PPE) resins are readily combinable with alkenyl aromatic resins in virtually all proportions and a great variety of thermoplastic products have been provided. These PPE-based compositions possess good chemical and physical properties such as impact strength, the ability to be flame retarded, good electrical properties as well as good processing properties. As a result, PPE compositions have found great utility in injection, foam and blow molding applications particularly in the automotive, appliance, industrial and electronic areas.

As noted, injection molding is an important process for fabricating PPE-based parts. One of the key processing properties of a thermoplastic resin is its melt behavior during the molding process. Improvements in melt behavior often correspond to great increases in processing efficiency and profitability. The ability of the resin to adequately fill the mold in ever shorter cycle times can be extremely advantageous to the thermoplastic molding industry and can result in lower costs to the end users of such thermoplastics.

It has now been discovered that low molecular weight copolymers of styrene and alpha methyl styrene are surprisingly effective for improving the melt flow behavior of PPE-alkenyl aromatic compositions without the attendant thermal instability normally associated with other low molecular weight styrenic resins.

Additionally it has been discovered that in a PPE-high impact polystyrene (HIPS) composition the partial replacement of HIPS by a combination of low molecular weight poly(styrene-co-alpha methyl styrene) (PS/PAMS) and a thermoplastic elastomer (such as a styrene-butadiene block copolymer) will not only achieve the expected improvement in impact strength, but will unexpectedly attain good or improved flow properties. This latter discovery is particularly important because it is often necessary or even critical in certain thermoplastic applications to maintain melt flow and heat distortion temperature (HDT) values above minimum specified values. It is not always feasible to achieve this effect by the use of plasticizers or by changing the PPE: alkenyl aromatic resin ratio.

Copolymers of styrene and alpha methyl styrene are particularly useful in compositions of the present invention because they possess a unique combination of chemical and physical properties which can be exploited to good advantage in such compositions. PS/PAMS copolymers have a higher HDT compared to polystyrene homopolymer. PS/PAMS copolymers have a higher de-polymerization temperature compared to poly alpha methyl styrene homopolymer.

Furthermore, PS/PAMS copolymers offer increased thermal stability compared to similar commercially available copolymers which additionally contain unsaturated aliphatic comonomers. Examples of these include PICCO 5140 resin and NEVEX 100 resin.

Additionally, PS/PAMS copolymers offer greater melt flow improvements compared to higher molecular weight styrenic homopolymers or copolymers.

The aforementioned advantages of PS/PAMS copolymers have been utilized in compositions of the present invention to provide polyphenylene ether based products which exhibit improved melt flow behavior even when such products are impact modified with rubbery additives or are flame retarded with halogenated compounds which tend to decrease the melt flow of the compositions.

SUMMARY OF THE INVENTION

The compositions of the present invention are comprised of:
(a) a polyphenylene ether resin;
(b) a rubber modified alkenyl aromatic resin; and
(c) a low molecular weight copolymer of styrene and alpha methyl styrene in an amount which is effective for improving the melt flow behavior of the combination of (a) and (b).

The PPE resin (a) is typically present in an amount from about 10 to about 90 parts by weight and, accordingly, the alkenyl aromatic resin (b) is present in an amount of about 90 to 10 parts by weight based upon 100 parts by weight of (a) and (b) combined. Preferably, the PPE resin is present in an amount from about 20 to about 70 parts by weight based upon 100 parts of (a) and (b) combined.

The polyphenylene ether resin is a homopolymer or copolymer and is primarily comprised of structural units of the formula

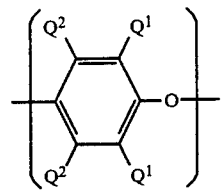

A preferred polyphenylene ether resin is poly(2,6-dimethyl-1,4-phenylene ether). Another is poly(2,6-dimethyl-co-2,3,6-trimethyl-1,4-phenylene ether).

The polyphenylene ether resin will typically have an intrinsic viscosity of about 0.35 to 0.55 deciliters per gram as measured in chloroform at 25° C.

The styrene and alpha methyl styrene copolymer is comprised of about 10 to about 90 parts by weight styrene and about 90 to about 10 parts by weight alpha methyl styrene, based upon the weight of 100 parts of styrene and alpha methyl styrene taken together. The copolymer may be prepared by a polymerization process utilizing free radical initiation of the styrene and alpha methyl styrene monomers. Several grades are commercially available.

Within the broad ratio of styrene to alpha methyl styrene, preferred copolymers will contain about 10 to 50 parts by weight styrene and, correspondingly, about 50 to 90 parts by weight alpha methyl styrene.

Since melt flow improvement is one of the objects of the invention it has been mentioned that the useful PS/PAMS copolymers have a relatively low molecular weight. Accordingly, typical PS/PAMS copolymers useful in the practice of the invention will have weight o average molecular weights less than about 5000. Preferable copolymers will have a weight average molecular weight ranging from about 1000 to about 4000. These weight average molecular weights can be determined by high pressure liquid chromatography.

Alpha methyl styrene affords other advantages to the copolymers used in the present compositions. Alpha methyl styrene polymers and copolymers have a higher heat distortion temperature compared to polystyrene. PS/PAMS copolymers used herein improve the thermal stability of the PPE-based thermoplastic compositions of the invention, as compared to similar compositions containing copolymers incorporating unsaturated aliphatic comonomers. Furthermore, the absence of additional monomers in the PS/PAMS copolymer especially unsaturated species as may be found in conventional additives, improves the color stability of the thermoplastic product. Examples of conventional low molecular weight resins not encompassed by the present invention included those known as Picco and Piccolastic resins.

The styrene and alpha methyl styrene copolymer (c) will typically be used in amounts up to about 15 parts and preferably about 3 to 15 parts and more preferably about 5 to 12 parts by weight per 100 parts of resins (a) and (b) taken together.

Compositions of the invention may also be further comprised of component (d), a thermoplastic elastomer in an amount sufficient to improve the impact strength of the combination of (a) and (b) and (c). The preferred thermoplastic elastomers are random, graft and block copolymers primarily comprised of styrenic units and diene rubber units; and are typically present in an amount of about 2 to about 20 parts by weight based upon the weight of 100 parts of (a) and (b) combined.

A preferred thermoplastic elastomer is a block copolymer of the A-B or A-B-A' type wherein the A and A' blocks are a styrenic polymer (e.g. polystyrene) and the B block is a rubbery diene polymer (e.g. polybutadiene).

The rubbery diene polymer may be of the type which is partially or completely hydrogenated. Partially hydrogenated block copolymers are commercially available. One useful type is known as SEBS rubber.

It is also contemplated that the compositions of the invention may be fabricated (as by molding or thermoforming) into useful articles of manufacture.

DETAILED DESCRIPTION

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of aryleneoxy structural units. The present invention includes all such variations and modifications, including but not limited to those described hereinafter.

The polyphenylene ethers favored for use in the practice of this invention generally contain structural units of the following formula

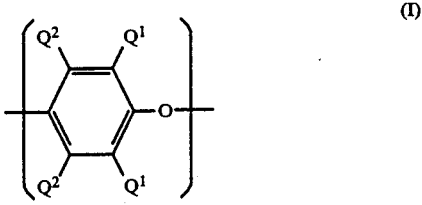

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, alkyl radicals are straight chain rather than branched. Most often, each $Q^1$ is alkyl or phenyl, especially $C_{1-3}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6,-trimethyl-1,4-phenylene ether units. Many suitable random copolymers, as well as homopolymers, are disclosed in the patent literature, including various Hay patents. Also contemplated are graft copolymers including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.35 to 0.60 deciliters per gram (dl./g.), as measured in solution in chloroform at 25° C.

The polyphenylene ethers may be prepared by known 5 methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (both monomeric and polymeric), o-hydroxyaryl oximes, and alpha-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

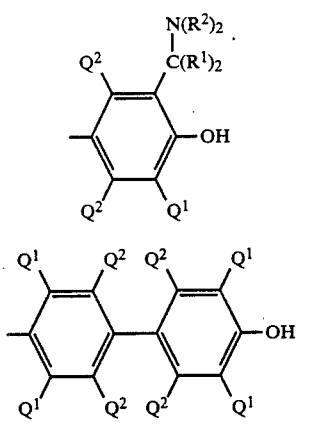

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

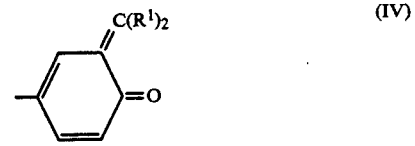

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706; 4,477,649 and 4,482,697 are particularly pertinent, and are incorporated herein by reference. In mixtures of this type, the diphenoquinone is ultimately incorporated into the polymer in substantial amounts, chiefly as an end group.

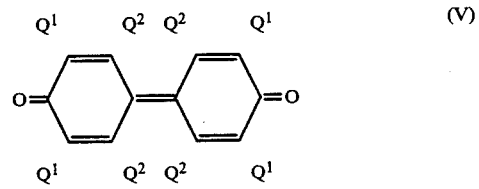

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The rubber modified, alkenyl aromatic compound useful as component (b) in the present compositions can be selected from any of the materials known generally in the art as high impact polystyrenes, or HIPS. In general, these modified polystyrene resins are made by adding rubber during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPDM) rubbers, styrene-butadiene copolymers (SBR), and polyacrylates. The amount of rubber employed will vary, depending on such factors as the process of manufacture and individual end-use requirements.

Included within this family of materials for purposes of the present invention are more recently developed forms in which such factors as the rubber particle size, the gel and cis contents of the rubber phase, the rubber morphology, and the rubber volume percent are regulated or controlled to achieve improvements in the impact resistance and other properties. These kinds of HIPS are described in the patent literature, including U.S. Pat. No. 4,128,602 (Katchman and Lee, Jr.), and U.S. Pat. No. 4,528, 327 (Copper and Katchman), which are incorporated herein by reference.

Also contemplated as suitable for use are high impact polystyrenes having morphological forms which are sometimes referred to as core-shell, comprising particles of rubber-encapsulated polystyrene dispersed in a matrix of polystyrene resin. Examples of this type are disclosed in U.S. Pat. No. 4,513,120 (Bennett, Jr. and Lee, Jr.), incorporated herein by reference as well as the above-mentioned U.S. Pat. No. 4,528,327.

Particularly preferred embodiments of the present invention will provide flame retarded thermoplastic resins.

Any conventional flame retarding system may be utilized such as aryl phosphate compounds and halogenated compounds and polymers. Halogenated compounds are often utilized in conjunction with metal synergists such as antimony oxides.

The aryl phosphate compounds such as triaryl phosphate (TPP) and commercial mixtures of aryl phosphates such as Kronitex 50 have a known plasticizing effect on PPE/HIPS compositions. In such systems, the melt flow improving effects of the present invention may be less noticeable.

On the other hand, resin compositions utilizing halogen based flame retardants often can remarkably benefit from melt flow enhancement. This is particularly true from bromine substituted polymers and oligomers.

For many applications, brominated polystyrene is a preferred flame retarding additive.

The brominated polystyrene can be prepared by following the procedures described in published European Patent Application 0047549 of Henry J. Barda. In general, the method of preparation comprises dissolving a polystyrene in a solvent, and reacting the dissolved polystyrene with a stoichiometric excess of bromine chloride (that is, an amount greater than that required for achieving the desired, theoretical degree of bromination), in the presence of up to about 15% by weight of a Lewis acid catalyst, based on the weight of the polystyrene, at temperatures of about 20° C. to about 50° C.

The bromination reaction can be represented by the following equation:

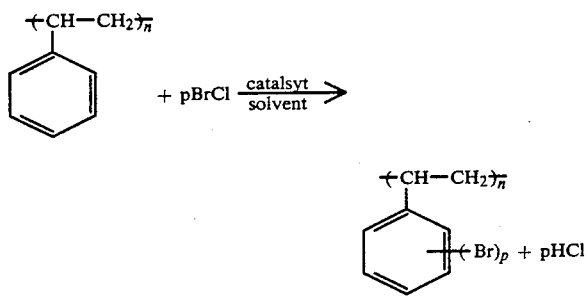

where n and n' represent the number of styrene monomer units in the respective polystyrene chains; and p represents the number, as an average, of bromine atoms added to (and displacing a corresponding number of hydrogen atoms from) the aromatic nucleus of each styrene monomer unit and is preferably from 1 to 3. As shown, hydrogen chloride is produced as a by-product of the reaction.

The molecular weight of the polystyrene reactant can range widely from about 7500 to over 200,000 as seen in the above published application of Borda, or in U.S. Pat. No. 4,352,909 of D.Ti. The molecular weight can be determined by gel permeation chromatography, as a weight average.

The polyphenylene ether, the alkenyl aromatic resin and the polystyrene/alpha methyl styrene copolymer resins may be combined in a conventional manner. The resins will typically be in powder or pellet form. The resins may be combined as by dry blending in a blender which provides a relatively uniform mixture of the resins. This mixture is typically directed to a thermoplastic extruder, usually of the single or twin-screw type, where in the case of a blend the resin is compounded with sufficient temperature and shear to provide an intimate thermoplastic blend.

The product of the conventional extruder is an extrudate in the form of strands which may be quenched with cooling water. The cooled strands are directed to a pelletizer device which provides the resin pellets having the composition of the present invention in a convenient form for use in thermoplastic applications.

During the blending step or downstream in the extruder it is contemplated that conventional additives may be incorporated in the resin mixture if desired. These include rubbery impact modifiers, flame retarding agents, stabilizers for thermal and color stability, antioxidants, processing aids and plasticizers, reinforcing and extending fillers, pigments and the like. Each of these may be utilized to a greater or lesser degree depending on the required final properties desired in the product.

DESCRIPTION OF THE SPECIFIC EMBODIMENTS

The invention is further illustrated in the description below, which is set forth to show a preferred or best embodiment. Parts are by weight unless otherwise noted.

EXAMPLES I-II and COMPARISON (A)

The composition shown in Table 1 was prepared by forming a dry blend of the ingredients, compounding the blend by passage through a 28 mm Werner Pfleiderer twin-screw extruder at about 573° F. melt temperature, and cooling and chopping the extrudate into pellets. The pellets were molded into 0.125 inch-thick miniature test pieces, using a 4 ounce Newbury injection molding machine, an about 542° F. melt temperature, and an about 150° F. mold temperature. In addition, using the same conditions, molded test pieces having the dimensions 0.06 inch by 0.5 inch by 5 inches were prepared for the UL subject 94 flame resistant test.

TABLE 1

| COMPOSITION | | | |
|---|---|---|---|
| | Amount, Parts by Weight* | | |
| Ingredients | I | II | (A) |
| Poly(2,6-dimethyl-1,4-phenylene ether)resin (PPO$^R$, General Electric Co., i.v. 0.46 dl./g., chloroform, 25° C.) | 40 | 40 | 40 |
| PS/PAMS Copolymer (K1120) | 5 | 10 | 0 |
| Rubber modified, high impact polystyrene (AH 1897, American Hoechst Co.) | 60 | 60 | 60 |

TABLE 1-continued

COMPOSITION

| Ingredients | Amount, Parts by Weight* | | |
|---|---|---|---|
| | I | II | (A) |
| Rubber modified copolymer of styrene and dibromostyrene | | | |
| Antimony oxide | 5 | 5 | 5 |

*All compositions also contained 2 pbw KD1101 (a mixture of SB diblock and SBS triblock copolymers); 3 pbw KG1652 (an SEBS triblock copolymer); 1.5 pbw polyethylene; and 0.15 pbw of each of ZnO and ZnS.

The rubber modified copolymer of styrene and dibromostyrene had the following characteristics:

| Bromine Content | 15.9% |
|---|---|
| Polybutadiene Content | 11.9% |
| Total % Br in Blend (approx.) | 8% |

The PS/PAMS Copolymer designated K1120 was a low molecular weight copolymer of styrene and para methyl styrene known as Kristalex 1120 from Hercules, Inc. and had a ring-and-ball softening point of about 241° F.

The various test pieces were exposed to common physical property tests in accordance with ASTM procedures and UL Subject 94 flame resistance procedures. The results are reported in Table 2. Small amounts (less than but equal to 5 pbw) of PS/PAMS copolymer markedly improve melt flow without sacrificing other important properties. In particular, HDT is not depressed as is the case for conventional flow-promoting plasticizers. Large amounts (greater than 5 pbw) of PS/PAMS copolymer increase melt flow further while retaining other properties to a sufficient degree.

TABLE 2

| | Properties | | |
|---|---|---|---|
| | I | II | (A) |
| Tensile Yield Strength (psi) | 6300 | 6200 | 6600 |
| Tensile Elongation (%) | 58 | 55 | 42 |
| Notched Izod Impact Resistance (ft.lb./in.-n.) | 4.4 | 3.3 | 4.3 |
| Heat Deflection Temperature (°F.) | 235 | 229 | 237 |
| Channel Flow Length, upon injection at about 520° F. under 10,000, psi (in.) | 15.0 | 18.0 | 11.5 |
| Gardner Impact Energy (in-lbs) | 155 | 134 | 143 |
| UL Subject 94 Test | | | |
| Average Self-Extinguishing Time (Secs.) and V-Rating 1/16-inch thick samples | 1.3 | 2.2 | 2.0 |
| | V-0 | V-0 | V-0 |

EXAMPLE III and COMPARISON (B)

The composition shown in Table 3 was prepared by forming a dry blend of the ingredients, compounding the blend by passage through a 28 mm Werner Pfleiderer twin-screw extruder at about 660° F. melt temperature, and cooling and chopping the extrudate into pellets. The pellets were molded into 0.125 inch-thick miniature test pieces, using a 4 ounce Newbury injection molding machine, an about 580° F. melt temperature, and an about 190° F. mold temperature. In addition, using the same conditions, molded test pieces having the dimensions 0.06 inch by 0.5 inch by 5 inches were prepared for the UL subject 94 flame resistance test.

TABLE 3

COMPOSITION

| Ingredients | Amount, Parts by Weight* | |
|---|---|---|
| | III | (B) (comparison) |
| Poly(2,6-dimethyl-1,4-phenylene ether)resin (PPO^R, General Electric Co., i.v. 0.40 dl./g., chloroform, 25° C.) | 60 | 60 |
| PS/PAMS Copolymer (K5140) | 3 | 0 |
| Rubber modified, high impact polystyrene (AH 1897, American Hoechst Co.) | 32 | 35 |
| Brominated Polystyrene (P68PB) | 6.7 | 6.7 |
| Antimony oxide | 2.3 | 2.3 |

*All compositions also contained 5 pbw KG1652 (an SEBS triblock copolymer); 1.5 pbw polyethylene; and 0.15 pbw of each of ZnO and ZnS.

The brominated polystyrene designated P68PB was a high molecular weight brominated polystyrene known as PYROCHEK ®68PB from Ferro Chemical and had an approximate bromine content of 67% by weight. The Total Br in Blend was approximately 4.1%.

The PS/PAMS Copolymer designated K5140 was a low molecular weight copolymer of styrene a para methyl styrene known as Kristalex 5140 from Hercules, Inc. and had a ring-and-ball softening point of about 279° F.

The various test pieces were exposed to common physical property tests in accordance with ASTM procedures and UL Subject 94 flame resistance procedures. The results are reported in Table 4. Small amounts less than but equal to 5 pbw) of PS/PAMS copolymer markedly improve melt flow without sacrificing other important properties.

TABLE 4

| Properties | III | (B) |
|---|---|---|
| Tensile Yield Strength (psi) | 8540 | 8540 |
| Tensile Elongation (%) | 18 | 20 |
| Notched Izod Impact Resistance (ft.lb./in.-n.) | 5.5 | 5.8 |
| Heat Deflection Temperature (°F.) | 271 | 270 |
| Channel Flow Length, upon injection at about 520° F. under 10,000 psi (in.) | 14.8 | 13.5 |
| Dynatup E total (in-lbs) | 334 | 314 |
| UL Subject 94 Test | | |
| Average Self-Extinguishing Time (Secs.) and V-Rating 1/16-inch thick samples | 2.3 | 4.2 |
| | V-0 | V-0 |

EXAMPLES IV-V and COMPARISON (C)

The composition shown in Table 5 was prepared by forming a dry blend of the ingredients, compounding the blend by passage through a 28 mm Werner Pfleiderer twin-screw extruder at about 661°–672° F. melt temperature, and cooling and chopping the extrudate into pellets. The pellets were molded into 0.125 inch-thick miniature test pieces, using a 4 ounce Newbury injection molding machine, an about 580°–583 ° F. melt temperature, and an about 190° F. mold temperature. In addition, using the same conditions, molded test pieces having the dimensions 0.06 inch by 0.5 inch by 5 inches were prepared for the UL subject 94 flame resistance test.

TABLE 5

| | COMPOSITION | | |
|---|---|---|---|
| | Amount, Parts by Weight* | | |
| Ingredients | IV | V | (C) |
| Poly(2,6-dimethyl-1,4-phenylene ether)resin (PPO<sup>R</sup>, General Electric Co., i.v. 0.40 dl./g., chloroform, 25° C.) | 65 | 65 | 65 |
| PS/PAMS Copolymer (K3085) | 0 | 5 | 0 |
| PS/PAMS Copolymer (K5140) | 3 | 0 | 0 |
| Rubber modified, high impact polystyrene (AH 1897, American Hoechst Co.) | 27 | 25 | 30 |
| Brominated Polystyrene (P68PB) | 6.7 | 6.7 | 6.7 |
| Antimony oxide | 2.3 | 2.3 | 2.3 |

*All compositions also contained; 5 pbw KG1652 (an SEBS triblock copolymer); 1.5 pbw polyethylene; and 0.15 pbw of each of ZnO and ZnS.

The K5140 was as defined above. The K3085 was a similar PS/PAMS copolymer having a ring-and-ball softening point of about 180° F. These blends had an approximate bromine content of 4.1% by weight.

The various test pieces were exposed to common physical property tests in accordance with ASTM procedures and UL Subject 94 flame resistance procedures. The results are reported in Table 6. Small amounts of either PS/PAMS copolymer markedly improve melt flow without sacrificing other important properties.

TABLE 6

| | Properties | | |
|---|---|---|---|
| | IV | V | (C) |
| Tensile Yield Strength (psi) | 8860 | 8920 | 8860 |
| Tensile Elongation (%) | 18 | 18 | 19 |
| Notched Izod Impact Resistance (ft.lb./in.-n.) | 5.6 | 5.6 | 6.0 |
| Heat Deflection Temperature (°F.) | 276 | 276 | 281 |
| Channel Flow Length, upon injection at about 520° F. under 10,000 psi (in.) | 13.2 | 13.9 | 12.2 |
| Dynatup E total (in-lbs) | 245 | 333 | 332 |
| UL Subject 94 Test | | | |
| Average Self-Extinguishing Time (Secs.) and V-Rating 1/16-inch thick samples | 4.3 | 4.1 | 2.3 |
| | V-0 | V-0 | V-0 |

EXAMPLES VI-VII and COMPARISONS (D) and (E)

The composition shown in Table 7 was prepared by forming a dry blend of the ingredients, compounding the blend by passage through a 28 mm Werner Pfleiderer twin-screw extruder at about 650°-653° F. melt temperature, and cooling and chopping the extrudate into pellets. The pellets were molded into 0.125 inch-thick miniature test pieces, using a 4 ounce Newbury injection molding machine, an about 573°-575° F. melt temperature, and an about 190° F. mold temperature. In addition, using the same conditions, molded test pieces having the dimensions 0.06 inch by 0.5 inch by 5 inches were prepared for the UL subject 94 flame resistance test.

TABLE 7

| | COMPOSITION | | | |
|---|---|---|---|---|
| | Amount, Parts by Weight* | | | |
| Ingredients | VI | VII | (D) (comparison) | (E) |
| Poly(2,6-dimethyl-1,4-phenylene ether)resin (PPO<sup>4</sup>, General Electric Co., i.v. 0.40 dl./g., chloroform, 25° C.) | 60 | 60 | 60 | 60 |

TABLE 7-continued

| | COMPOSITION | | | |
|---|---|---|---|---|
| | Amount, Parts by Weight* | | | |
| Ingredients | VI | VII | (D) (comparison) | (E) |
| PS/PAMS Copolymer (K5140) | 3 | 5 | 0 | 0 |
| Rubber modified, high impact polystyrene (AH 1897, American Hoechst Co. | 33 | 31 | 36 | 36 |
| Brominated Polystyrene (P68PB) | 6.7 | 6.7 | 6.7 | 6.7 |
| Antimony oxide | 2.3 | 2.3 | 2.3 | 2.3 |
| Polyester Oligomer A433B | 1 | 1 | 0 | 1 |

*All compositions also contained 4 pbw KG1652 (an SEBS triblock copolymer); 1.5 pbw polyethylene; 0.15 pbw of each of ZnO and ZnS; and 1 pbw Irganox ® 1010 high molecular weight hindered phenolic antioxidant. The polyester oligomer A433 is a conventional plasticizing additive known as Admex 433, available from Nuodex: The total % Br in the Blends was approximately 4%.

The various test pieces were exposed to common physical property tests in accordance with ASTM procedures and UL Subject 94 flame resistance procedures. The results are reported in Table 8. Small amounts of PS/PAMS copolymer in combination with a conventional polyester plasticizer markedly improve melt flow without sacrificing other important properties. In particular, HDT is not depressed as is the case for conventional flow-promoting plasticizers.

TABLE 8

| | Properties | | | |
|---|---|---|---|---|
| | VI | VII | D | (E) |
| Tensile Yield Strength (psi) | 8560 | 8600 | 8580 | 8510 |
| Tensile Elongation (%) | 19 | 19 | 19 | 18 |
| Notched Izod Impact Resistance (ft.lb./in.-n.) | 5.6 | 5.4 | 6.0 | 5.9 |
| Heat Deflection Temperature (°F.) | 258 | 258 | 265 | 258 |
| Channel Flow Length, upon injection at about 520° F. under 10,000 psi (in.) | 15.5 | 16.1 | 13.2 | 14.4 |
| Dynatup E total (in.lbs) | 319 | 341 | 347 | 253 |
| UL Subject 94 Test | | | | |
| Average Self-Extinguishing Time (Secs.) and V-Rating 1/16-inch thick samples | 3.0 | 2.4 | 6.4 | 3.3 |
| | V-0 | V-0 | V-1 | V-0 |

EXAMPLES VIII and COMPARISON (F)

The composition shown in Table 9 was prepared by forming a dry blend of the ingredients, compounding the blend by passage through a 28 mm Werner Pfleiderer twin-screw extruder at about 650°-656° F. melt temperature, and cooling and chopping the extrudate into pellets. The pellets were molded into 0.125 inch-thick miniature test pieces, using a 4 ounce Newbury injection molding machine, an about 580° F. melt temperature, and an about 190° F. mold temperature. In addition, using the same conditions, molded test pieces having the dimensions 0.06 inch by 0.5 inch by 5 inches were prepared for the UL subject 94 flame resistance test.

TABLE 9

COMPOSITION

| Ingredients | Amount, Parts by Weight* | |
|---|---|---|
| | VIII | (F) |
| Poly(2,6-dimethyl-1,4-phenylene ether)resin (PPO$^R$, General Electric Co., i.v. 0.40 dl./g., chloroform, 25° C.) | 65 | 65 |
| PS/PAMS Copolymer (K5140) | 3 | 0 |
| Rubber modified, high impact polystyrene (AH 1897, American Hoechst Co.) | 27 | 31 |
| Brominated polystyrene (P68PB) | 6.7 | 6.7 |
| Antimony oxide | 2.3 | 2.3 |
| S-EB-S rubber (KG1651) | 5 | 4 |

*All compositions also contained 1 pbw Irganox 1010 antioxidant; 2 pbw bisphenol A; 1.5 pbw polyethylene; and 0.15 pbw of each of ZnO and ZnS.

The total percent bromine in the blend was approximately 3.9%.

The various test pieces were exposed to common physical property tests in accordance with ASTM procedures and UL Subject 94 flame resistance procedures. The results are reported in Table 10. Replacement of 4 pbw of the HIPS resin with 3 pbw of the PS/PAMS copolymer combined with an additional 1 pbw of impact modifier improved the melt flow as measured by flow channel while maintaining or improving other physical properties.

TABLE 10

| Properties | VIII | (F) |
|---|---|---|
| Tensile Yield Strength (psi) | 8830 | 8870 |
| Tensile Elongation (%) | 19 | 18 |
| Notched Izod Impact Resistance (ft.lb./in.-n.) | 5.7 | 5.5 |
| Heat Deflection Temperature (°F.) | 264 | 264 |
| Channel Flow Length, upon injection at about 520° F. under 10,000 psi (in.) | 14.9 | 14.1 |
| Dynatup impact E total (in-lbs) | 400 | 321 |
| UL Subject 94 Test | | |
| Average Self-Extinguishing Time (Secs.) and V-Rating 1/16-inch thick samples | 2.4 | 3.1 |
| | V-0 | V-0 |

EXAMPLES IX and COMPARISON (G)

The composition shown in Table 11 was prepared by forming a dry blend of the ingredients, compounding the blend by passage through a 28 mm Werner Pfleiderer twin-screw extruder at about 575° F. melt temperature, and cooling and chopping the extrudate into pellets. The pellets were molded into 0.125 inch-thick miniature test pieces, using a 4 ounce Newbury injection molding machine, an about 535° F. melt temperature, and an about 150° F. mold temperature. In addition, using the same conditions, molded test pieces having the dimensions 0.06 inch by 0.5 inch by 5 inches were prepared for the UL subject 94 flame resistance test. The PROCESSABILITY description in Table 12 is based upon a qualitative observation of each material upon molding in a television back housing molding tool after molding on a 700 ton HPM molding machine.

TABLE 11

COMPOSITION

| Ingredients | Amount, Parts by Weight* | |
|---|---|---|
| | IX | (G) |
| Poly(2,6-dimethyl-1,4-phenylene ether)resin (PPO$^R$, General Electric Co., i.v. 0.40 dl./g., chloroform, 25° C.) | 40 | 40 |
| PS/PAMS Copolymer (K1120) | 10 | 0 |
| Unsaturated flow promoter (Nevex 100) | 0 | 10 |
| Rubber modified, high impact polystyrene (AH 1897, American Hoechst Co.) | 53 | 53 |
| Brominated polystyrene concentrate (CN348) | 30 | 30 |
| Antimony oxide | 5 | 5 |
| Polyester Oligomer (A433) | 8.5 | 8.5 |

*All compositions also contained 10 pbw KD1101 (a mixture SB diblock and SBS triblock copolymers); 1.0 pbw polyethylene; and 0.15 pbw of each of ZnO and ZnS.

The various test pieces were exposed to common physical property tests in accordance with ASTM procedures and UL Subject 94 flame resistance procedures. The results are reported in Table 12. It is evident from the data that PS/PAMS copolymer based blends offer better processability for image parts compared to blends using an unsaturated alternative flow promoter such as Nevex 100.

TABLE 12

| Properties | IX | (G) |
|---|---|---|
| Tensile Yield Strength (psi) | 5400 | 5400 |
| Tensile Elongation (%) | 74 | 70 |
| Notched Izod Impact Resistance (ft.lb./in.-n.) | 3.1 | 3.0 |
| Heat Deflection Temperature (°F.) | 183 | 181 |
| Channel Flow Length, upon injection at about 520° F. under 10,000 psi (in.) | 25.5 | 26.0 |
| UL Subject 94 Test | | |
| Average Self-Extinguishing Time (Secs.) and V-Rating 1/16-inch thick samples | 2.2 | 1.3 |
| | V-0 | V-0 |
| Processability (Appearance) | Best | Poor |

As the above Examples indicate, all of compositions of the claimed invention exhibit superior channel flow length and tensile properties as compared to those compositions described by the prior art. The claimed compositions, moreover, essentially maintain other desirable properties, particularly heat deflection and notched impact strength.

The above-mentioned patents, patent application and publications are incorporated herein by reference.

Other modifications and variations of this invention are possible and are contemplated as within the scope of this invention. For example, instead of poly(2,6-dimethyl-co-2,3,6-trimethyl-1,4-phenylene ether). It should be understood, therefore, that changes may be made in the particular embodiments shown without departing from the principles of the invention or sacrificing its chief benefits.

We claim:

1. A thermoplastic composition having improved melt flow behavior, comprising:
   (a) a polyphenylene ether resin;
   (b) a rubber-modified alkenyl aromatic resin;
   (c) a low molecular weight copolymer of styrene and alpha methyl styrene in an amount which improves the melt flow of the combination of (a) and (b); and (d) a thermoplastic elastomer in an amount sufficient to improve the impact strength of the combination of components (a), (b), and (c).

2. A composition as in claim 1 wherein said thermoplastic elastomer is a block copolymer primarily comprised of styrenic units and diene rubber units.

3. A composition as in claim 2 wherein said thermoplastic elastomer is present in an amount of about 2 to about 20 parts by weight based upon the weight of 100 parts of (a) and (b) combined.

4. A composition as in claim 2 wherein said thermoplastic elastomer is a block copolymer of the A-B or A-B-A' type wherein the A and A' blocks are a styrenic polymer and the B block is a rubbery diene polymer.

5. A composition as in claim 4 wherein the A or A' block is styrene and the B block is polybutadiene.

6. A composition as in claim 5 wherein the rubbery diene polymer is partially or completely hydrogenated.

* * * * *